US009477668B2

(12) United States Patent
David et al.

(10) Patent No.: US 9,477,668 B2
(45) Date of Patent: Oct. 25, 2016

(54) CONTENT ELEMENT EDITOR

(75) Inventors: Kissinger Peterson Justin David, Coppell, TX (US); Ooshma K. Malkoti, Coppell, TX (US); Zouhair Sebati, Edgewater, NJ (US); Senthil Kumar Prem Kumar, Lewisville, TX (US); Harmeet Nandrey, Coppell, TX (US); Midde D. Bharadwaj, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 989 days.

(21) Appl. No.: 13/110,199

(22) Filed: May 18, 2011

(65) Prior Publication Data

US 2012/0297013 A1 Nov. 22, 2012

(51) Int. Cl.
*G06F 13/00* (2006.01)
*G06F 17/30* (2006.01)

(52) U.S. Cl.
CPC ..... *G06F 17/30056* (2013.01); *G06F 17/3023* (2013.01); *G06F 17/30867* (2013.01); *G06F 17/3087* (2013.01)

(58) Field of Classification Search
CPC .................. G06F 17/30056; G06F 17/30867; G06F 17/3087; G06F 17/3023
USPC .......................... 709/217–219, 220–222, 225; 715/744–747, 229, 234
See application file for complete search history.

(56) References Cited

U.S. PATENT DOCUMENTS

| 6,199,099 B1* | 3/2001 | Gershman et al. ........... 709/203 |
| 6,941,376 B2* | 9/2005 | Mitchell et al. .............. 709/229 |
| 7,216,290 B2* | 5/2007 | Goldstein et al. ............. 715/234 |
| 2002/0013850 A1* | 1/2002 | Mitchell et al. .............. 709/229 |
| 2003/0221167 A1* | 11/2003 | Goldstein et al. ............ 715/513 |
| 2012/0131442 A1* | 5/2012 | Grizim .................... G06F 17/24 715/234 |

* cited by examiner

*Primary Examiner* — Kenneth R Coulter (57) ABSTRACT

A system may include a communications device. The system may further include a content editor executed by said communications device and configured to present a content element including a plurality of contexts, each of said plurality of contexts associated with a version of content items to be included in a content presentation and a set of context attributes descriptive of user attributes for which said context is to be provided.

5 Claims, 5 Drawing Sheets

FIG. 1

"Availability" Element
> Contexts
——— Element Description 200

——— User Interface 160-A

Content Editor - Context                                                                                       X Context Name: [HighSpeed]  ——— Context Identifier Field 205

Regions:
☐ Select / Deselect All
☐ North East
☐ South East
☐ West
☐ OOF

⎫
⎬ Context Attribute Group 210-A
⎭

——— Context Attribute Fields 215

State:
☐ Select / Deselect All

| | | | | | | | |
|---|---|---|---|---|---|---|---|
|☐AL|☐CO|☐GA|☐IA|☐MD|☐MT|☐NY|☐OR|☐SD|☐VA|
|☐AK|☐CT|☐GU|☐KS|☐MA|☐NE|☐NC|☐PW|☐TX|☐WA|
|☐AS|☐DE|☐HI|☐KY|☐MI|☐NV|☐ND|☐PA|☐TN|☐WV|
|☐AZ|☐DC|☐ID|☐LA|☐MN|☐NH|☐MP|☐PR|☐UT|☐WI|
|☐AR|☐FM|☐IL|☐ME|☐MS|☐NJ|☐OH|☐RI|☐VT|☐WY|
|☐CA|☐FL|☐IN|☐MH|☐MO|☐NM|☐OK|☐SC|☐VI|

⎫
⎬ Context Attribute Group 210-B
⎭

Service Type:
☑ High Speed Qualified     ——— Context Attribute Fields 215

⎫ Context Attribute Group 210-C

Content Partners:
☐ Yahoo!    ☐ MSN

⎫ Context Attribute Group 210-D

CONTENT ELEMENT EDITOR

BACKGROUND

Some web pages are static, and provide the same information to all users regardless of context. Other web pages are dynamic, and are generated by a web application or server-side scripting running on a web server.

Static web pages have various advantages, such as low processing requirements on the web server and ease of caching. Dynamic web pages have other advantages, such as that they may be prepared with fresh content for each viewing, and that they allow for customization to the particular preferences of the user. Regardless of whether static or dynamic web pages are used, however, maintenance of a large number of versions of a web page can be a time consuming and error prone process.

DETAILED DESCRIPTION

A content presentation, such as a web site, may be defined to have multiple versions. More specifically, each version of the content presentation may include a version of a content element tailored to different regions, locations, or other attributes of a requesting user. By defining multiple versions of the content element in an organized manner, a content provider may provide a user of a web site with a version tailored to the user's attributes, while at the same time lowering maintenance costs and reducing potential errors in updating content.

To give a specific example, a web site for a service provider may include an availability content element. The availability content element may inform a user whether he or she is within an area in which the service provider offers service. Based on the location of a user visiting the web site, different content may be displayed within the availability content element. For instance, if the user is in an area in which the service provider offers service, the availability content element may indicate to the user that service is available. However, if the user is in an area where service is only offered to some portion of households, the availability content element may provide an input for a telephone number to allow the user to query the service provider to see if service is available. Alternately, if the user is in an area where service is not offered, the availability content element may indicate that service is unavailable at this time and to check back later.

As another example, a web site for a company may provide different content depending on whether a user is associated with a content partner of the company. For instance, the availability content element may include a special offer if, according to attributes of the user, the user is associated with a content partner of the company.

A content editor may be implemented to provide a user (such as an author or administrator) with an ability to maintain different versions of an element of content to be displayed in a content presentation. The content editor may be configured to allow the user to create, edit, and delete the different versions of a content element. Different versions of the element may be referred to as contexts, and different contexts may be organized based on user location and other user specific parameters. The content editor may further allow the user to associate context attributes (such as user location and content partner) with each different context of the content element, allowing the user to define which version of the element is to be provided to whom and according to what criteria.

In some instances, the content editor may be implemented as an additional feature of an existing content presentation maintenance tool. In other examples, the content editor may be implemented as a standalone content management utility. While web pages are used to provide certain illustrative examples, it should be understood that the disclosed content editor is not limited to web pages and is applicable to other types of content presentation as well.

Figure 1:
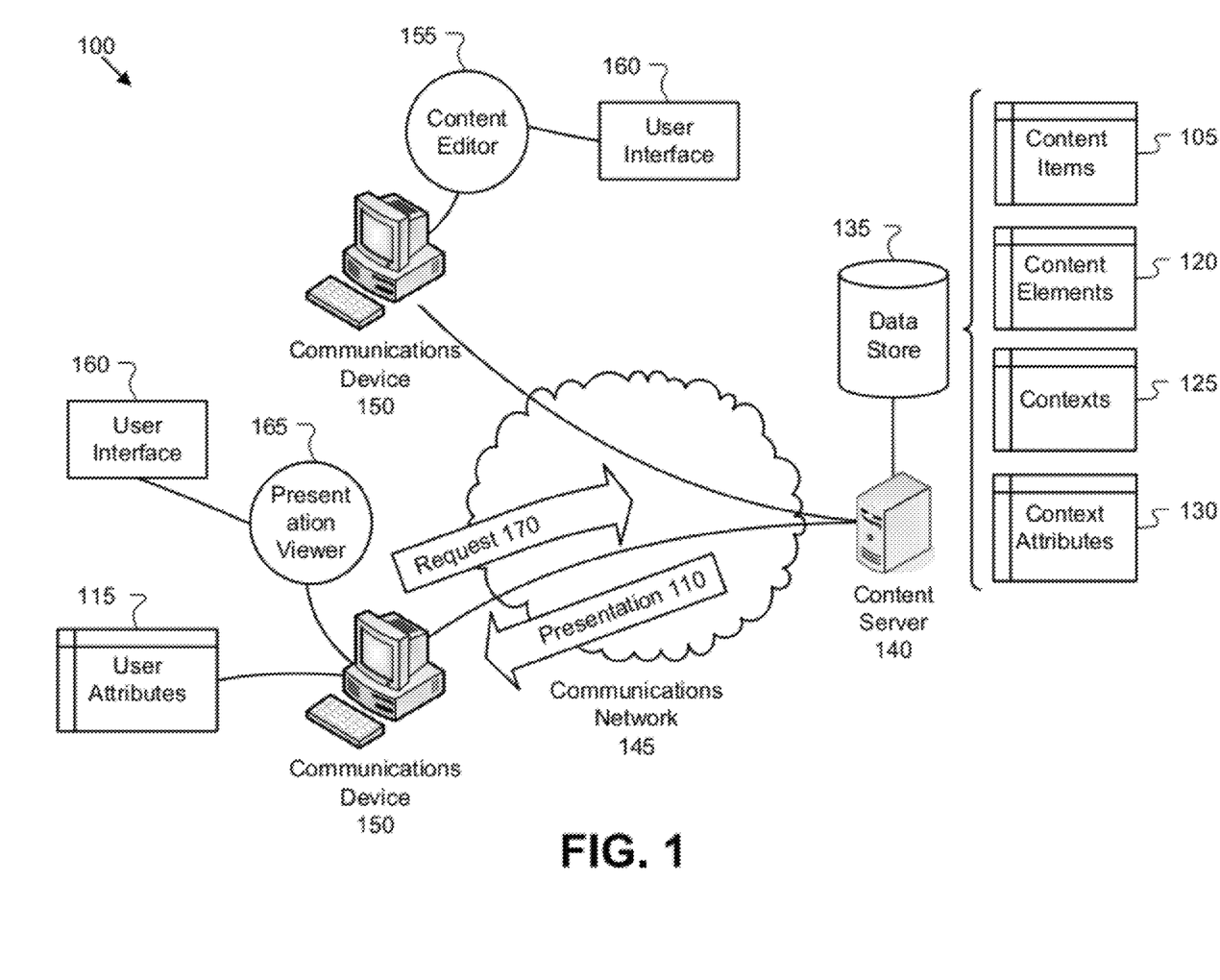
FIG. 1 illustrates an exemplary system for the maintenance and delivery of content items according to attributes of a user.

FIG. 1 illustrates an exemplary system 100 for the maintenance and delivery of content presentations 110 according to user attributes 115. The system 100 includes content items 105, content elements 120, contexts 125, and context attributes 130 from which content presentations 110 may be generated. Data elements such as the content items 105, content elements 120, contexts 125, and context attributes 130 may be stored by a data store 135 in communication with a content server 140. The system 100 may further include a content editor 155 executed by a communications device 150 and configured to maintain the content items 105, content elements 120, contexts 125, and context attributes 130. The system may further include a presentation viewer 165 executed by a communications device 150 and configured to send requests 170 to the content server 140 over a communications network 145, provide user attributes 115 to the content server 140, and receive content presentations 110 from the content server 140 responsive to the request 170. System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used.

The term content (or instance of content) may be used to refer generally to a document, image, text, hypertext markup, audio, video, or any segment, portion, component, or combination of these or other forms of content that may be presented to and experienced (e.g., viewed or heard) by a user. Content items 105 may include one or more instances of content. For example, an exemplary content item 105 may include an image component and a textual component accompanying the image component.

A content presentation 110 may include one or more content items 105. Some examples of content presentations 110 may include web sites, slideshows, audio presentations, or television programming.

User attributes 115 may include one or more attributes of a user. For example, one type of user attribute 115 may include an indication of a location of the user, such as the user's telephone number, postal code, Internet Protocol address, state, city, county, province or country. As another example, a user attributes 115 may indicate a content partner of a user, and/or an indication of some other characteristic of the user, such as age, sex, race, gender, marital status, interests, or income level. In some examples user attributes 115 may be stored on a communications device 150, such as in the form of a cookie. A cookie may include one or more name-value pairs containing bits of information, such as the indication of a location of the user.

Content items 105 for a content presentation 110 may be arranged into one or more content elements 120. Some content elements 120 remain unchanged and may be referred to as static content elements 120. Other content elements 120 may vary according to user attributes 115, and may be referred to as dynamic content elements 120.

A dynamic content element 120 may include a plurality of contexts 125, where each context 125 is associated with a different version of the content items 105 of the content element 120. In addition to content items 105, each of the plurality of contexts 125 may be associated with a set of context attributes 130 descriptive of user attributes 115 for which the particular context 125 is to be provided. A representation of an exemplary content element 120 is discussed in detail below with respect to FIG. 4.

The data store 135 may include one or more data storage mediums, devices, or configurations, and may employ various types, forms, and/or combinations of storage media, including but not limited to hard disk drives, flash drives, read-only memory, and random access memory. The data store 135 may include various technologies useful for storing and accessing any suitable type or form of electronic data, which may be referred to as content. Content may include computer-readable data in any form, including, but not limited to video, image, text, document, audio, audio-visual, metadata, and other types of files or data. Content may be stored in a relational format, such as via a relational database management system (RDBMS). As another example, content may be stored in a hierarchical or flat file system. As yet another example, content may be stored in the form of extensible markup language (XML) files. Exemplary data that may be stored in the data store 135 include content items 105, content elements 120, contexts 125 and context attributes 130, among other types.

The content server 140 may be configured to communicate with the data store 135 and provide and manage the various types of data stored in the data store 135. The content server 140 may further be configured to communicate with communications devices 150 via communications links over the communications network 145. Exemplary communications networks 145 may include the Internet, an intranet or other private packet-switched network, a cable television network (e.g., a hybrid fiber-coax network), a wireless broadcast network (e.g., a satellite media broadcasting network or terrestrial broadcasting network), a telephone network (e.g., the public switched telephone network (PSTN), a cellular telephone network), a provider-specific network (e.g., a Verizon® FIOS® network), an optical fiber network, or any other suitable network. While FIG. 1 shows a single content server 140, in other embodiments, content may be provided and managed by way of multiple content servers 140 at one or more locations. In some examples, the content server 140 and data store 135 elements of exemplary system 100 may be combined in whole or in part.

Communications devices 150 may be devices configured to be operated by one or more users, authors, and/or content administrators. Exemplary communications devices 150 may include cellular telephones, laptop computers, tablet computing devices, personal digital assistants, and desktop computer workstations, among others. The communications devices 150 may include one or more components capable of receiving input from a user, and providing output to the user. Communications device 150 may be implemented as a combination of hardware and software, and may include one or more software applications or processes for causing one or more computer processors to perform the operations of the communications device 150 described herein.

The content editor 155 may be one such application included on a communications device 150, and may be implemented at least in part by instructions stored on one or more non-transitory computer-readable media. The content editor 155 in combination with the communications device 150 may be in communication with the content server 140, and may be configured to create, edit, update, and delete data stored in the data store 135 to be included in a content presentation 110. More specifically, the content editor 155 may be configured to create, edit, update, and delete content elements 120, contexts 125 associated with the content elements 120, context attributes 130 associated with the contexts 125, and content items 105 associated with the contexts 125.

The content editor 155 may be configured to provide a user interface 160 to allow for the operation and control of the functions of the communications device 150. The content editor 155 may further provide feedback and other output to the user through the user interface 160. Exemplary user interfaces 160 may make use of hardware included in the communications devices 150, such as keyboards, buttons, and microphones, display screens and loudspeakers.

The presentation viewer 165 may be another application included on a communications device 150, and may be implemented at least in part by instructions stored on one or more non-transitory computer-readable media. The presentation viewer 165 may be configured to provide a user interface 160 to allow for the access, selection, and control of presentations 110 accessible by the communications device 150. More specifically, the presentation viewer 165 may be configured to send a request 170 to a content server 140, provide user attributes 115 to the content server 140, and receive a content presentation 110 in response to the request 170 according to the user attributes 115.

Exemplary presentation viewers 165 for web page content presentations 110 may include various web browsers, including but not limited to Microsoft® Internet Explorer™, Opera®, Firefox®, K-Meleon™, Google® Chrome™ and Apple® Safari® web browsers. With respect to user attributes 115 in the context of web browser presentation viewers 165, a web page presentation viewer 165 may be configured to provide information to a content server 140 such as postal code entered by a user into a web page. The presentation viewer 165 may further be configured to receive and maintain a cookie including one or more user attributes 115 determined by and received from the content server 140 based on the provided information. For example, the presentation viewer 165 may be configured to receive a cookie as a field in the header of a hypertext transfer protocol (HTTP) response received from the content server 140. This cookie may then be sent back to the content server 140 to indicate user attributes 115 of the user when the presentation viewer 165 later accesses the content server 140. The cookie may accordingly include one or more user attributes 115 of the user.

In some examples, the content editor 155 and the presentation viewer 165 may be included in different communications devices 150. In other examples, the content editor 155 and the presentation viewer 165 may both be included on the same communications device 150, or may be combined into a single application. In some cases, the content editor 155 may be implemented as an additional feature of an existing content presentation maintenance tool.

In general, computing systems and/or devices, such as the data store 135, the content server 140 and the communications devices 150, may employ any of a number of computer operating systems, including, but by no means limited to, versions and/or varieties of the Microsoft Windows® and Windows Phone operating systems distributed by Microsoft Corporation of Redmond, Wash., the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as communications device 150 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. The content editor 155 and presentation viewer 165 may be written according to a number of these and other programming languages and technologies, or a combination thereof.

In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein (such as data store 135) may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

Different versions of a content element 120 may be included in a content presentation 110 based on the user attributes 115 of the user requesting the content presentation 110. To allow for this matching of a context 125 of a content element 120 to user attributes 115, each context 125 of the content element 120 is associated with context attributes 130 to use to match against the user attributes 115 of the requesting user. The content editor 155 may be used to define these content attributes 130.

Once the content element 120 is defined, the content server 140 may be configured to receive a client request 170 for a content presentation 110 including the content element 120. The content server 140 may further be configured to determine which of the plurality of contexts 125 of the content element 120 to include in the content presentation 110. This may be performed by matching user attributes 115 of the requesting user with context attributes 130 associated with the contexts 125 of the content element 120. Once the most applicable context 125 is determined, the content server 140 may provide the content presentation 110 including the content items 105 associated with the respective context 125 determined to be most applicable.

Figure 2:
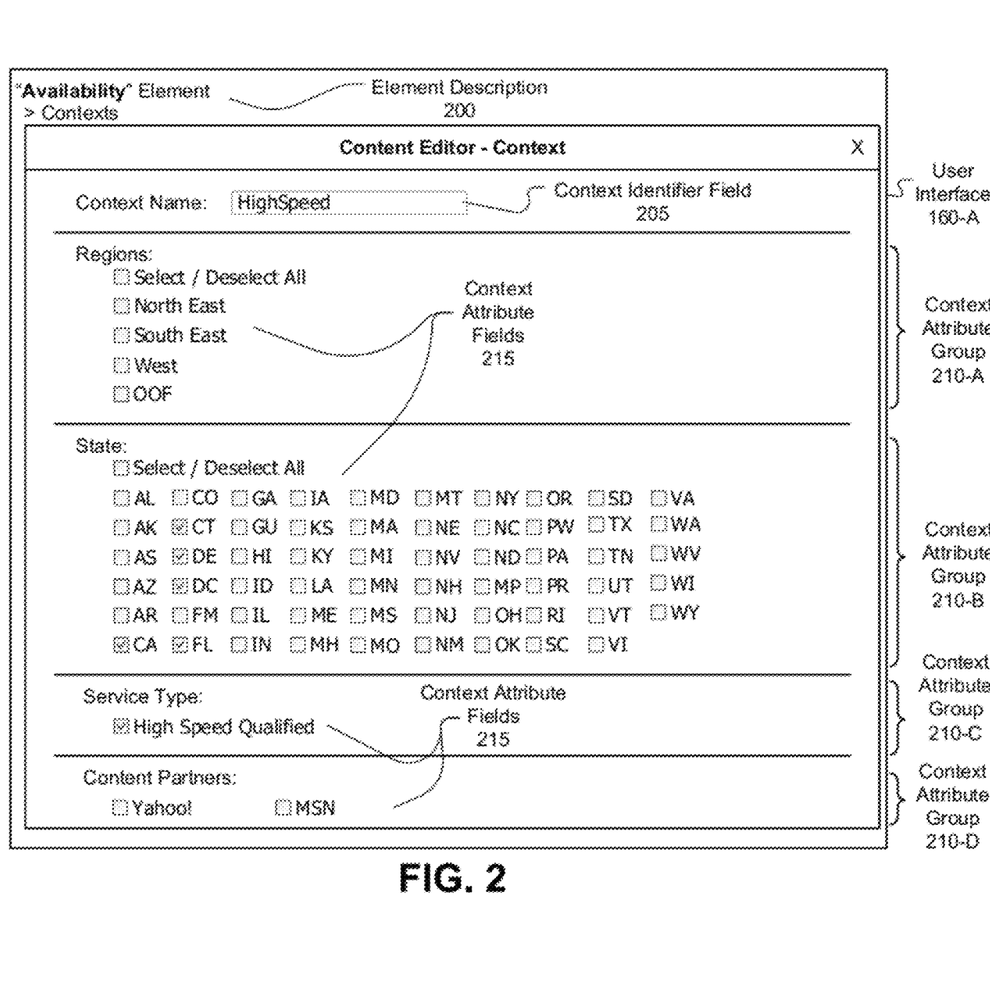
FIG. 2 illustrates an exemplary user interface of a content editor for the configuration of a context attributes of a context of a content element.

FIG. 2 illustrates an exemplary user interface 160-A of a content editor 155 for the configuration of a context attributes 130 of a context 125 of a content element 120. The user interface 160-A provides an element description 200, a context identifier field 205, a plurality of context attribute groups 210, and a plurality of context attribute fields 215 within the groups for use in the configuration of the context 125. Using an interface such as user interface 160-A, an author or administrator may edit or update the context attributes 130 of a context 125 of a content element 120.

The element description 200 may be configured to provide information regarding the content element 120 being edited, such as the name of the content element 120, and a listing of any contexts 125 of the content element 120. As shown, the "Availability" content element 120 is indicated as being edited, but no contexts 125 have yet been defined for the content element 120.

The context identifier field 205 of the user interface 160-A may be configured to allow for a name or identifier descriptive of the context 125 to be entered. As shown, a context 125 identified as "High-Speed" is indicated in the context identifier field 205.

The context attribute groups 210 of the user interface 160-A are descriptive of configurable groups of context attributes 130 that may be assigned to a context 125. Each context attribute group 210 may serve to define the options for a particular context attribute 130. Four context attributes 130 of a context 125 are illustrated in the exemplary user interface 160-A, namely: "Regions"; "State"; "Service Type"; and "Content Partners."

The context attribute fields 215 of the user interface 160-A are descriptive of context attributes 130 choices available for each context attribute group 210. Accordingly, the context attribute fields 215 are grouped into sections within the context attribute groups 210 according to context attributes 130. For each context attribute 130, the user interface 160-A facilitates selection of options that describe the user attributes 115 that match the context 125 being edited.

The context attribute groups 210 and included context attribute fields 215 displayed in the user interface 160-A relate to the potential user attributes 115 of a user. For example, for the illustrated "High-Speed" context 125, certain context attribute fields 215 with respect to the "State" context attribute 130 are selected as matching in the user interface 160-A. Additionally, the "High Speed Qualified" "Service Type" context attribute field 215 has been selected as matching in the user interface 160-A for the context 125. Thus, a user whose user attributes 115 indicate that the user is located in one of those states and who is high speed qualified may match this context 125 of the content element 120.

Using these context attribute fields 215, the context attributes 130 for the context 125 may be defined. Additionally, further contexts 125 for a content element 120 may similarly be defined or edited using the user interface 160-A.

Figure 3:
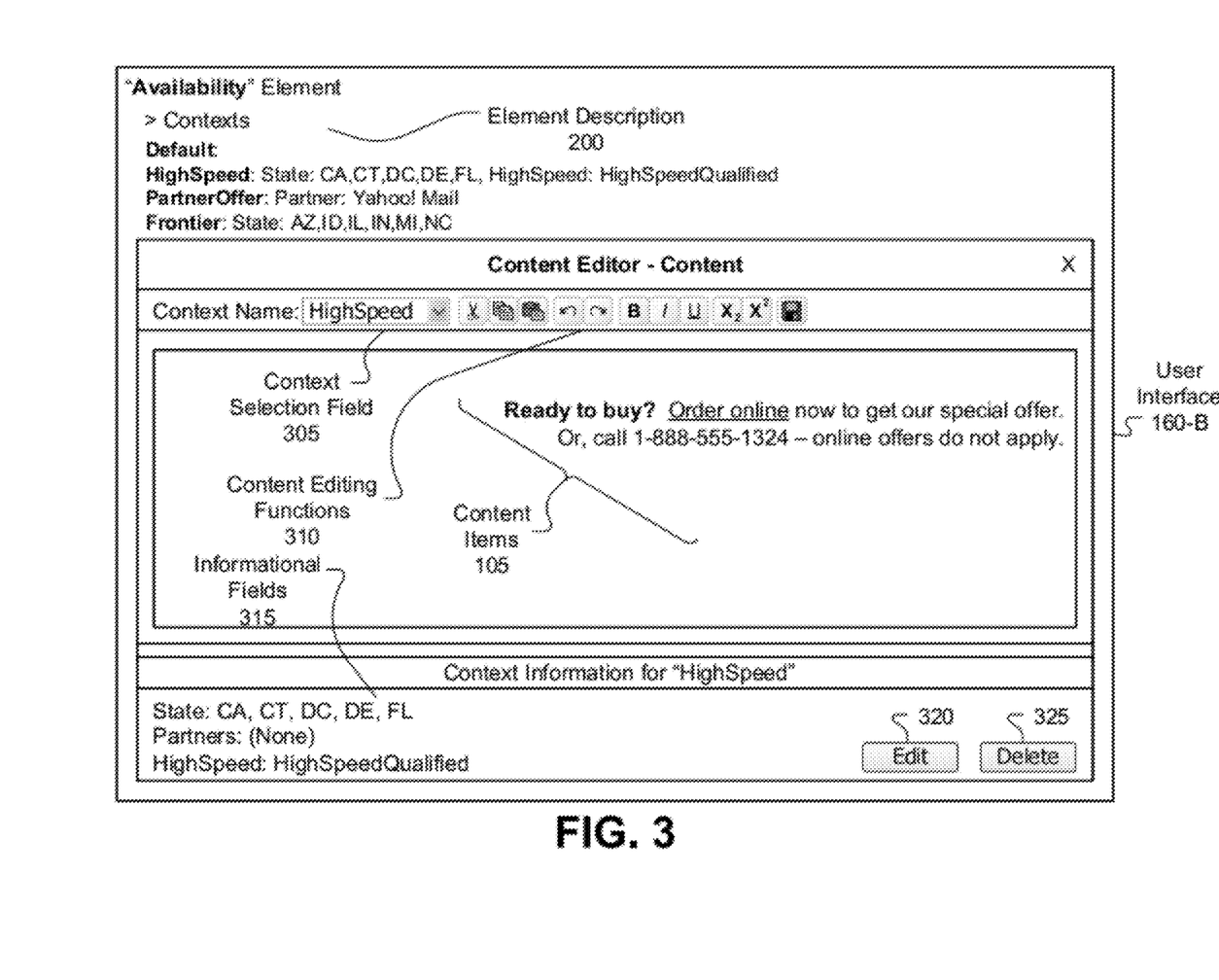
FIG. 3 illustrates an exemplary user interface of a content editor for the editing of content items associated with a particular context of a content element.

FIG. 3 illustrates an exemplary user interface 160-B of a content editor 155 for the editing of content items 105 associated with a particular context 125 of a content element 120. The user interface 160-B includes an element description 200 providing information regarding the content element 120 being edited, and also a context selection field 305 for the selection of a context 125 of the content element 120 to edit. The user interface 160-B further includes content editing functions 310 to facilitate the editing of the associated content items 105. The user interface 160-B additionally includes informational fields 315, edit button 320, and delete button 325 to allow a user to view and edit details of the content attributes 130 of the context 125 whose content items 105 are being edited.

As discussed above with respect to user interface 160-A, the element description 200 may be configured to provide information regarding the content element 120 being edited, such as the name of the content element 120, and a listing of any contexts 125 of the element. As shown, the "Availability" content element 120 is indicated as being edited, and a listing of each of the contexts 125 of the content element 120 is further provided, including the context attributes 130 associated with each context 125.

The context selection field 305 may provide a dropdown list from which a user may select a context 125 from the available contexts 125 for the content element 120. A user of the user interface 160-B may edit each of the available contexts 125 independently by selecting the appropriate context identifier from the context selection field 305 dropdown list. The context selection field 305 may further include an item configured to allow the user to create new contexts 125 from the user interface 160-B. As illustrated in user interface 160-B, the "High-Speed" context 125 defined in user interface 160-A has been selected for content item 105 editing.

The user interface 160-B may further include various content editing functions 310 as may typically be found in an editor application, such as cut, copy, paste functions, bold, underline, italic, and other formatting functions. For instances in which the content editor 155 is implemented as an additional feature of an existing content presentation maintenance tool, these editing functions may include some or all of the editing functions of the existing tool into which the content editor 155 is included. As a particular example, the content editor 155 may be implemented as an extension to the web site content management tools provided by Oracle Corporation.

The user interface 160-B may further include informational fields 315 descriptive of the context attributes 130 of the context 125 whose content items 105 are being edited. As illustrated in user interface 160-B, the context attributes 130 for the "High-Speed" context 125 are displayed in the informational fields 315.

The edit button 320 may be included in the user interface 160-B to allow the user to bring up the user interface 160-A for editing of the context attributes 130 of the context 125. The delete button 325 may be included in the user interface 160-B to allow the user to delete the content 125 being edited.

By way of the user interfaces 160-A and 160-B of the content editor 155, a plurality of contexts 125 may be defined for content element 120. Once the contexts 125 are defined or updated, a user may use a save content editing function 310 to apply the changes to the contexts 125 to the storage, e.g., to the data in data store 135. As one example, a content element 120 and all associated contexts 125 may be serialized out into a single XML file.

Figure 4:
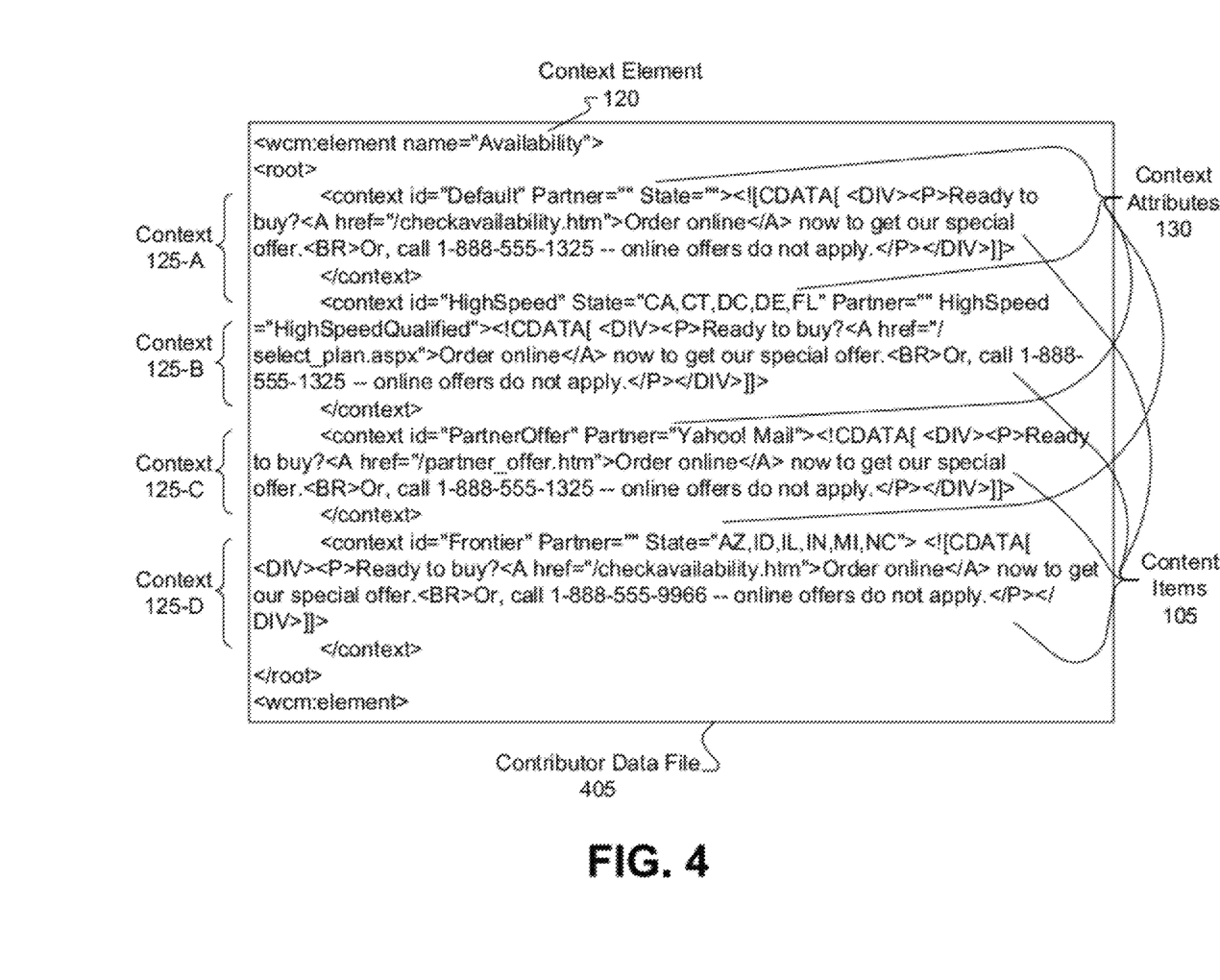
FIG. 4 illustrates an exemplary XML representation of a content element having a plurality of contexts.

FIG. 4 illustrates an exemplary XML representation of a content element 120 having a plurality of contexts 125. This XML representation of the content element 120 may be referred to as a contributor data file 405. The contributor data file 405 as shown describes a content element 120 identified as "Availability" that may be used as part of a content presentation 110 for a service provider. Four contexts 125-A through 125-D are defined for the content element 120, each having its own identifier, context attributes 130, and associated content items 105. The contributor data file 405 of the content element 120 therefore includes all of the information required to determine which content items 105 are to be included in a content presentation 110 for a content element 120 based on user attributes 115. Further, the contributor data file 405 also includes all the information necessary to allow the content editor 155 to load and edit the content element 120.

Context 125-A of the contributor data file 405 is identified as "Default" and includes content items 105 descriptive of a default version of the content items 105. Because the "Default" context 125-A does not require any particular context attributes 130, the "Default" context 125-A is available for use even when no other contexts 125 match the user attributes 115. Further, the content items 105 associated with the "Default" context 125-A include a link to a web page from which the user may generally check for availability of service.

Context 125-B of the contributor data file 405 is identified as "High-Speed" and includes content items 105 descriptive of a version of the "Availability" element 120 that may be used for users for whom high speed service is available. As shown, the context attributes 130 for the "High-Speed" context 125-B include a listing of states for which high speed service is available. Further, the content items 105 associated with the "High-Speed" context 125-A include a link to a web page from which the user may select a high speed service plan.

Context 125-C of the contributor data file 405 is identified as "Partner" and includes content items 105 descriptive of a version of the "Availability" element 120 that may be used for users associated with a context partner of the service provider. As shown, the context attributes 130 for the "Partner" context 125-C include the "Yahoo!" mail provider, which solely for purpose of the example is a partner of the service provider. Further, the content items 105 associated with the "Partner" context 125-A include a link to a web page from which the user may review and purchase a special partner offer.

Context 125-D of the contributor data file 405 is identified as "Frontier" and includes content items 105 descriptive of a version of the "Availability" element 120 that may be used for users accessing the web site from an area in which the service provider is rolling out service and may not have complete coverage. As shown, the context attributes 130 for the "Frontier" context 125-D include a listing of states for which service is still being rolled out. Further, the content items 105 associated with the "Frontier" context 125-A include a link to a web page from which the user may check availability of service. Additionally, the content items 105 associated with the "Frontier" context 125-A include a different telephone access number that should be used by users who reside in the "Frontier" area described by the context attributes 130.

Figure 5:
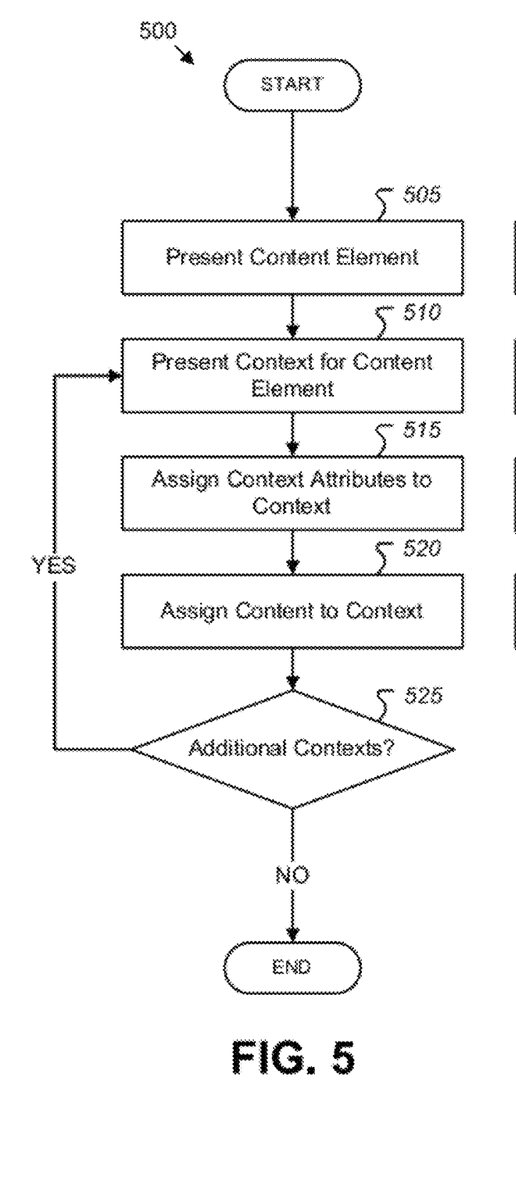
FIG. 5 illustrates an exemplary process flow for the editing of a content element including a plurality of contexts.

FIG. 5 illustrates an exemplary process flow 500 for the editing of a content element 120 including a plurality of contexts 125. The process 500 may be performed by various systems, such as the system 100 described above with respect to FIG. 1. For example, the process 500 may be performed at least in part by the content editor 155 executed by a communication device 150 of system 100.

In block 505, the content editor 155 presents a content element 120. For example, a user may define a new content element 120, such as by providing a name or other identifier for the new content element 120. In other examples, the user may select an existing content element 120 to be edited, such as from a list of content elements 120 existing in a data store 135.

In block 510, the content editor 155 presents a context 125 for the content element 120 being accessed. For example, as shown in user interfaces 160-A, the user may define a name or identifier for the context 125 using the context identifier field 205. In other examples, the content editor 155 may open an existing context 125 for the content element 120 for editing, such as by way of the edit button 320 of user interface 160-B.

In block 515, the content editor 155 assigns context attributes 130 descriptive of the context 125. For example, the user may use the context attribute groups 210 and context attribute fields 215 of user interface 160-A to define context attributes 130 appropriate for the context 125 being created or edited.

In block 520, the content editor 155 assigns content items 105 to the context 125. For example, the user may use the content editing functions 310 of the user interface 160-B to define the content items 105 appropriate for the content 125 being defined.

In block 525, the content editor 155 determined whether additional contexts 125 should be presented. For example, the user may indicate to the content editor 155 that at least one additional context 125 is to be defined or edited. If additional contexts 125 should be presented, then control passes to block 510. Otherwise, process flow 500 ends.

Figure 6:
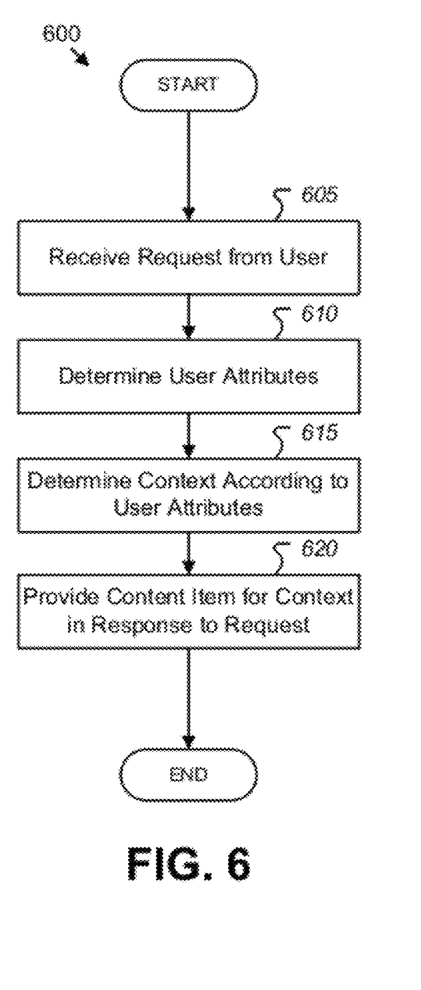
FIG. 6 illustrates an exemplary process flow for including appropriate content items in a content presentation using a content element.

FIG. 6 illustrates an exemplary process flow 600 for including appropriate content items 105 in a content presentation 110 using a content element 120. The process 600 may be performed by various systems, such as the system 100 described above with respect to FIG. 1. For example, the process 600 may be performed at least in part by the content server 140.

In block 605, the content server 140 receives a request 170 for content from a communications device 150. For example, a user of a communications device 150 may direct presentation viewer 165 application executed by the communications device 150 to navigate to a selected web site content presentation 110.

In block 610, the content server 140 determines user attributes 115 associated with the user. For example, the content server 140 may read a cookie stored on the communications device 150 and including user attributes 115 descriptive of the user of the communications device 150.

In block 615, the content server 140 determines content to send to the communications device 150 based on the user attributes 115. For example, the content server 140 may retrieve data from the data store 135 descriptive of the content elements 120 of the requested content presentation 110. For each content element 120 of the content presentation 110, the content server 140 may compare the context attributes 130 of each available context 125 of the content element 120 with the user attributes 115 of the requesting user. Based on the comparisons, the content server 140 may determine the context 125 whose context attributes 130 best matches the user attributes 115 of the requesting user.

In block 620, the content server 140 provides the content presentation 110 to the communications device 150 including the content items 105 of the context 125 whose context attributes 130 best match the user attributes 115 of the user of the communications device 150. After block 620, the process 600 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the disclosure is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A non-transitory computer readable medium tangibly embodying computer-executable instructions, the instructions being executable to provide operations comprising:

maintaining content elements to be included in a content presentation, each content element including a plurality of contexts to be selectively provided as the content element in the content presentation according to user attributes, each of said plurality of contexts associated with a set of context attributes descriptive of user attributes for which said context is to be provided as the content element in the content presentation and including a version of content items to be included in the content presentation as the content element;

associating, by a communications device executing a content editor, context attributes with contexts of a content element to be included in a content presentation; and associating, by the communications device executing the content editor, content items with contexts of the content element corresponding to said associated context attributes.

2. The computer readable medium of claim 1, further including instructions executable to provide operations comprising:

receiving a client request for said content presentation from the communications device;

determining which of the plurality of contexts of the content item to retrieve according to user attributes associated with the communications device; and providing the content item associated with the respective context to the communications device in response to the client request.

3. The computer readable medium of claim 2, further comprising determining said respective context by identifying one of said plurality of context whose context attributes best match said user attributes.

4. The computer readable medium of claim 1, further including instructions executable to provide operations comprising determining said user attributes by retrieving data stored in a cookie at the communications device.

5. The computer readable medium of claim 1, further including instructions executable to provide operations comprising maintaining each of the content elements as an extensible markup (XML) file in a data store.

* * * * *